(12) United States Patent
Eggert et al.

(10) Patent No.: US 6,962,098 B2
(45) Date of Patent: Nov. 8, 2005

(54) UNDERMOLDED STRUCTURES AND METHOD OF MAKING SAME

(75) Inventors: Daniel M. Eggert, Kenosha, WI (US); Marco E. DeVecchis, Racine, WI (US)

(73) Assignee: Snap-on Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/642,018

(22) Filed: Aug. 18, 2003

(65) Prior Publication Data

US 2005/0039581 A1  Feb. 24, 2005

(51) Int. Cl.[7] .............................................. B25B 13/00
(52) U.S. Cl. ....................... 81/124.6; 81/121.1; 81/900
(58) Field of Search ................................ 81/119, 121.1, 81/460, 488, 489, 492, 124.6, 900; 76/114

(56) References Cited

U.S. PATENT DOCUMENTS

| | | | |
|---|---|---|---|
| 2,620,001 A * | 12/1952 | Fratz et al. ................. 81/177.1 |
| 4,165,771 A * | 8/1979 | Curati, Jr. ........................ 81/20 |
| 4,979,355 A | 12/1990 | Ulevich |
| 5,009,628 A | 4/1991 | Rouillot |
| 5,149,054 A | 9/1992 | Passerell et al. |
| 5,176,050 A | 1/1993 | Sauer et al. |
| 5,259,277 A * | 11/1993 | Zurbuchen ................. 81/177.1 |
| 5,263,389 A | 11/1993 | Frazzell et al. |
| 5,299,474 A | 4/1994 | Hohmann et al. |
| 5,359,911 A * | 11/1994 | Kruesi .......................... 81/436 |
| 5,421,931 A * | 6/1995 | Carmien ...................... 156/172 |
| 5,446,941 A * | 9/1995 | Kelsay ....................... 15/235.4 |
| 5,452,622 A | 9/1995 | Fenelon |
| 5,493,777 A | 2/1996 | Burke |
| 5,542,900 A | 8/1996 | Burke |
| 5,591,084 A | 1/1997 | Poulin et al. |
| 5,657,674 A * | 8/1997 | Burnett ........................... 81/22 |
| 5,695,176 A | 12/1997 | Colford |
| 5,700,543 A * | 12/1997 | Bendick et al. ............... 428/71 |
| 5,797,180 A | 8/1998 | Buchholz |
| 5,890,811 A | 4/1999 | Bryson |
| 5,947,070 A | 9/1999 | Immel et al. |
| 6,029,547 A * | 2/2000 | Eggert et al. ............. 81/124.6 |
| 6,148,482 A * | 11/2000 | Maraman, Jr. ............... 16/421 |

* cited by examiner

Primary Examiner—David B. Thomas
(74) Attorney, Agent, or Firm—Seyfarth Shaw LLP

(57) ABSTRACT

A molded tool structure has a non-metallic body and a continuous band of flexible and resilient non-metallic material encompassing the body and bonded to its exterior surface. The body may be a tool or a tool part. Also, the body may have one or more metal inserts insert molded therein, in which case there is a band encompassing each such insert. In one embodiment the body is a socket with inserts at both ends and in another embodiment the body is a driver shank with a double-ended screwdriver bit having a Phillips tip insert molded in the body and a flat-blade tip projecting from the body. The tool structure is molded by placing the flexible and resilient band or bands in a mold cavity, the body material being injected into the cavity so that it flows inside the band or bands and forces each band against the mold at the peripheral of the cavity. Any inserts are positioned in the cavity on suitable fixtures inside the bands so that the material flows between the bands and the inserts.

24 Claims, 2 Drawing Sheets

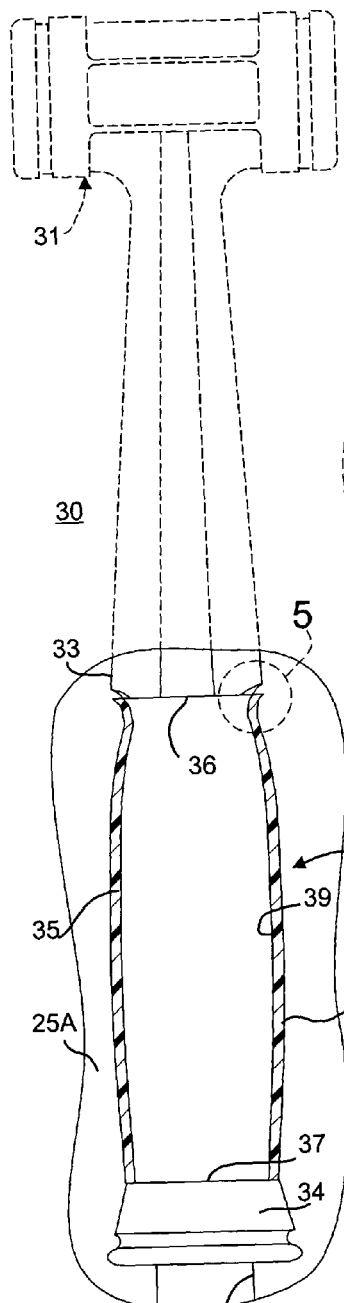
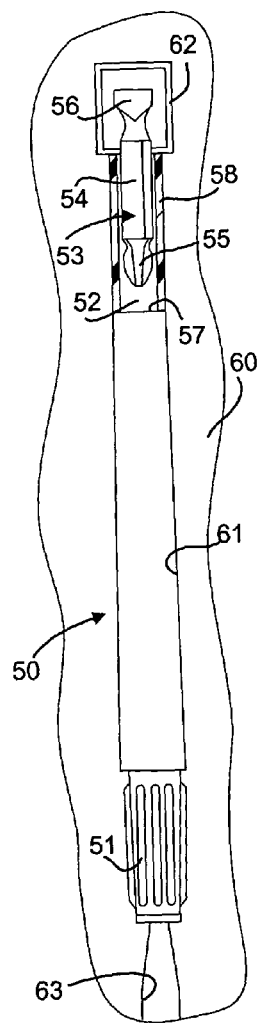
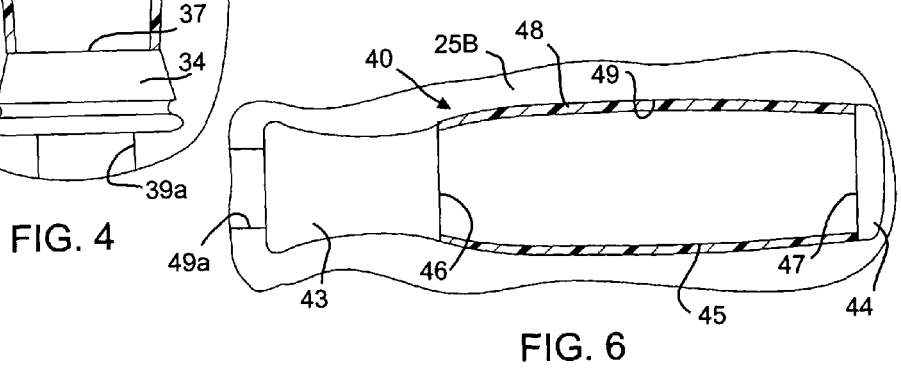
FIG. 4
FIG. 5
FIG. 6
FIG. 7

UNDERMOLDED STRUCTURES AND METHOD OF MAKING SAME

BACKGROUND

This application relates to structures, which may be hand tools or tool parts, and methods of making same, and particularly to tools formed of non-metallic materials. This application discloses an improvement of tools disclosed in copending U.S. application Ser. No. 09/005,680, filed Jan. 12, 1998, and entitled "Composite Socket with Duel Inserts and Annular Reinforcing Member", now U.S. Pat. No. 6,029,547, the disclosure of which is incorporated herein by reference.

That prior application discloses a socket tool body formed of a glass-fiber reinforced nylon material with insert molded metal inserts in both of the driving and driven ends thereof, and with metal or rigid plastic reinforcing members disposed so as to encompass one or both inserts. These reinforcing members are provided, since it had been found that, under very high torque loads, such insert-molded socket tools might tend to fail by fragmenting apart. It is believed that this occurred by reason of fracture lines propagating along knurls on the outer surfaces of the inserts, causing portions of the surrounding plastic material to break away. The reinforcing members inhibited such fragmentation and, in certain embodiments, further inhibited propagation of fracture lines under high torque loads.

However, the embedment of the reinforcing members in the socket body requires a separate insert molding operation, with a separate set of mold tooling. In the case of plastic reinforcing members, an alternative process could be to use two nozzles which inject two dissimilar materials at timed intervals into the mold, but this also requires a higher tooling expense.

Apart from reinforcement, the formation of tools or tool parts of dissimilar inner and outer materials has also been used for other purposes, such as electrical insulation, improved hand grips and the like. Formation of these tools and tool parts has also typically required plural-step molding operations.

SUMMARY

There is disclosed herein an improved structure and a novel method of forming same, which avoid disadvantages of prior constructions and methods.

An important aspect is the formation of a part with an inner body and a flexible and resilient non-metallic outer band.

Another aspect is the provision of reinforcement for a molded tool or tool part by the use of a flexible and resilient reinforcing member.

In connection with the foregoing aspect, another aspect is the use of a reinforcing member which is formed of a thermoplastic elastomer.

Another aspect is the provision of a tool of the type set forth, wherein the reinforcing member is bonded to the tool body.

A still further aspect is the provision of a novel method of forming, in a single insert molding operation, a molded part with inner and outer materials.

In connection with the foregoing aspect a further aspect is the provision of a method of the type set forth, wherein thermoplastic elastomeric members are pre-positioned in a mold cavity so as to be chemically bonded to a mold material injected inside the elastomeric members.

Certain ones of these and other aspects maybe realized, by providing a tool structure comprising a non-metallic body having an exterior surface, and a continuous band of flexible and resilient non-metallic material encompassing the body and bonded to the exterior surface.

Other aspects may be realized by providing a tool structure of the type set forth, wherein an insert is disposed in an end of the body and fixed thereto, with the band being disposed around the insert.

Other aspects may be realized by providing a method of forming a tool structure comprising: providing a mold defining a mold cavity, disposing in the mold cavity a pre-formed continuous band of flexible and resilient non-metallic material, and then injecting into the cavity moldable thermoplastic material so that it flows inside the band and forces the band against the mold at the periphery of the cavity and bonds to the band.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 4 is a view in partial section of a tool and mold tooling for forming same in accordance with another embodiment;

FIG. 5 is an enlarged view of a portion of FIG. 4;

FIG. 6 is a fragmentary view similar to FIG. 4 of another type of tool handle and tooling for making same; and FIG. 7 is a view similar to FIG. 6 of a composite tool shank and tooling for making same in accordance with another embodiment.

DETAILED DESCRIPTION

Figure 1:
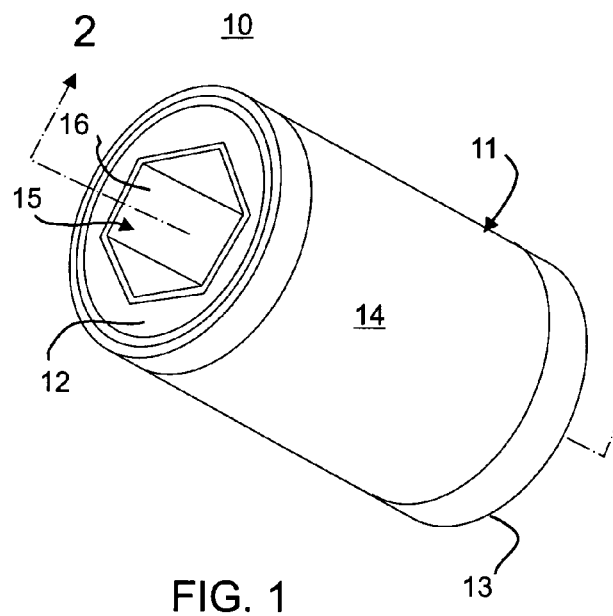
FIG. 1 is a perspective view of a composite socket tool in accordance with a first embodiment.
Figure 2:
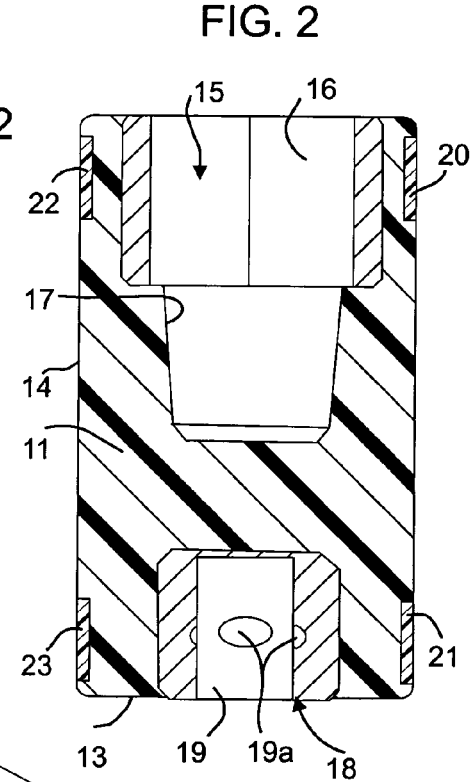
FIG. 2 is an enlarged sectional view taken generally along the line 2—2 in FIG. 1.

Referring to FIGS. 1 and 2, there is illustrated a socket tool, generally designated by the number 10, which has a composite cylindrical body 11 having a driving end 12 and a driven end 13. The body 11 is formed of a composite, moldable material, such as a high-strength, glass fiber-reinforced injection molding compound, which may be a 60% glass-filled nylon material. The body 11 has an exterior cylindrical surface 14. Insert molded in the driving end 12 of the body 11 is an insert 15, which may be formed of metal, and has a fastener-engaging opening 16 therethrough which has a polygonal transverse cross section, such as hexagonal. A frustoconical bore 17 is formed in the body 11 and communicates with the opening 16. Another insert 18, which may also be metal, is insert molded in the driven end 13 of the body 11, the insert 18 defining a receptacle 19 which has a square transverse cross section and may be provided with detent recesses 19a, in a known manner. The inserts 15 and 18 may be disposed so that their end faces are substantially flush with the adjacent end faces of the body 11.

The tool 10 also includes two continuous reinforcing bands 20 and 21, respectively disposed in recesses 22 and 23 in the exterior surface 14 so as to be substantially flush with that surface. The bands 20 and 21 are respectively disposed adjacent to the ends 12 and 13 of the body 11, respectively encompassing the inserts 15 and 18. Each of the bands 20 and 21 is formed of a flexible and resilient non-metallic material. Each may be formed of a thermoplastic elastomeric material, such as that sold under the tradename "SANTO-PRENE" by Advanced Elastomer Systems and designed for bonding to nylon.

Figure 3:
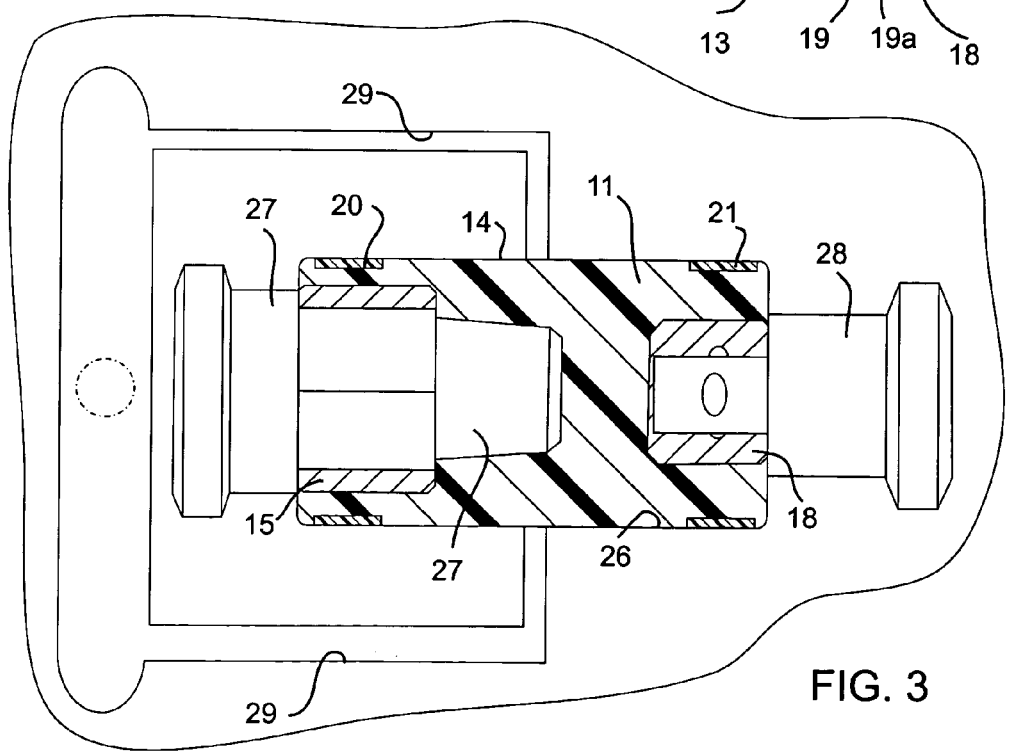
FIG. 3 is a fragmentary sectional view of the socket of FIG. 1 disposed in mold tooling for forming same.

Referring now to FIG. 3, there is illustrated a mold tool 25 usable in molding the socket tool 10. It will be appreciated that the mold tool 25 is one of two similar tools which meet at a parting line substantially at the plane of the paper and cooperate to define a mold cavity 26. Respectively disposed at opposite ends of the cavity 26 are holding fixtures 27 and 28 for respectively supporting the inserts 15 and 18 in the cavity 26, coaxially therewith and respectively at the opposite ends thereof. The mold tool 25 is provided with inlet runners 29 communicating with opposite sides of the cavity 26 for injecting a plastic mold material into the cavity 26 in a known manner.

In operation, when it is desired to mold the socket tool 10, the inserts 15 and 18 are respectively mounted on the holding fixtures 27 and 28, and then pre-formed cylindrical thermoplastic elastomeric bands 20 and 21 are respectively seated in the cavity 26, respectively in encircling the inserts 15 and 18. It will be appreciated that the bands 20 and 21 have sufficient stiffness that they will retain their substantially cylindrical shape in the mold cavity 21. Preferably, they are respectively longitudinally centered with respect to the inserts 15 and 18, so that they are respectively spaced slight distances from opposite ends of the cavity 26.

After the mold is closed, molten mold material of the body 11 is injected through the runners 29 and flows under pressure around the circumference of the cavity 26 and toward the opposite ends thereof. More specifically, the mold material flows between the bands 20 and 21 and the corresponding inserts 15 and 18, the pressure serving to expand the bands 20 and 21 and force them under pressure against the wall of the cavity 26. It will be appreciated that the mold material is prevented by the holding fixtures 27 from flowing inside the insert 15. The mold material may be injected at a temperature in the range of from about 560° F. to about 580° F. This temperature is sufficient to melt the inner surfaces of the bands 20 and 21, causing a chemical bonding between the bands 20 and 21 and the mold material. After the mold material has set, the mold is open and the holding fixtures 27 and 28 removed, the fixture 27 leaving the bore 17 in the body 11. The finished tool socket 10 is then removed from the mold cavity 26.

Unexpectedly, it has been found that the molding operation does not move the bands 20 and 21 from their pre-positioned locations centered longitudinally with respect to the inserts 15 and 18. It also has been found that, surprisingly, the elastomeric bands 20 and 21 retain the body 11 against fracturing substantially as effectively as metal or rigid plastic reinforcing structures.

Referring to FIGS. 4 and 5, there is illustrated a composite hammer 30 having a head 31 and an elongated shaft forming a handle 32 at its rearward end. The handle 32 has a front end 33 and a rear end 34 and a recess 35 extending therebetween, the recess 35 extending around the entire perimeter of the handle 32 and terminating at shoulders 36 and 37, respectively at the front and rear ends 33 and 34. A grip 38 is disposed in the recess 35, encompassing the handle 32 and abutting the shoulders 36 and 37. The body of the handle 32 may be formed of the same material as the body 11, described above, and the grip 38 may be formed of the same material as the reinforcing bands 20 and 21, described above. The handle 32 (and possibly the entire hammer 30) may be formed in a mold cavity 39 having a mold material inlet runner 39a at one end thereof. In forming the hammer 30, the pre-formed grip 38 is disposed in the cavity 39, so that when the mold material is injected through the inlet runner 39a, it expands the grip 38 and forces it laterally outwardly against the walls of the mold cavity 35. The mold material may be injected at a temperature sufficient to melt the inner surface of the grip 38, forming a chemical bond with it so that, when the mold material cools, the grip 38 is permanently bonded to the handle 32.

Referring to FIG. 6, there is illustrated another tool handle 40, which maybe for a screwdriver or the like, and has a front end 43 and a rear end 44 with a recess 45 extending therebetween and around the periphery of the handle 40 for defining shoulders 46 and 47. A grip 48 is disposed in the recess 45 and abutting the shoulders 46 and 47. The handle 40 may be formed in a mold cavity 49 having a mold material inlet runner 49a at the front end thereof. In molding of the tool handle 40, the pre-formed grip 48 is first disposed in the cavity 49 so that the mold material is injected through the center of the grip 48, forcing it radially outwardly against the wall of the cavity 49. It will be appreciated that the handle 40 and the grip 48 may, respectively, be formed of the same materials as the handle 32 and grip 38, described above, and the mold material may chemically bond with the grip 48 in the same manner described above in connection with the handle 32 of FIG. 4. The grips 38 and 48 provide a cushioning and non-slip grip for the user's hand, as well as serving as reinforcing bands for preventing fragmentation of the handle in the event of fracture.

Referring to FIG. 7, there is illustrated a tool shank 50, which may be shank for a screwdriver, and may be usable with the handle 40 of FIG. 6. The shank 50 may be formed of a glass-filled nylon material like that described above for the tools 10, 30 and 40, and has a fluted or splined portion 51 at one end thereof for press-fitting or insert molding in an associated handle, such as the handle 40, and a working end 52. A double-ended bit 53 is insert molded in the working end 52. The bit 53 may have a shaft 54 which may be polygonal, such as hexagonal, in transverse cross section, and is provided at one end with a Phillips tip 55 and at the other end with a flat-blade tip 56. The Phillips tip 55 and most of the shaft 54 are inserted molded in the shank 50, so that the flat-blade tip 56 projects longitudinally from the working end 52. A band 58, which may be formed of the same material as the bands 20 and 21, is disposed in a recess 57 at the working end 52 in encompassing relationship with the shaft 54 and the Phillips tip 55.

The tool shank 50 may be formed in a mold tool 60 having a cavity 61 provided at one end with a holding fixture 62 for holding the bit 53 coaxially in one end of the cavity 61, the mold also having an inlet runner 63 extending axially into the other end of the cavity 61. In use, the bit 53 is held so that the Phillips tip 55 and the shaft 54 are disposed in the cavity 61, and the reinforcing band 58 is fitted in the cavity 61 around the portion of the bit 53 therein. Then, the mold material is injected through the inlet runner 63, flowing between the bit 53 and the band 58, forcing the band 58 laterally upwardly against the wall of the cavity 61, and melting the inner surface of the reinforcing band 58 so as to chemically bond therewith, in the manner described above with respect to the bands 20 and 21 and the grips 38 and 48. The Phillips tip 55 serves to provide a good solid non-rotatable anchor of the bit 54 in the body of the shank 50, while the band 58 retains the working end of the tool shank 50 against fragmentation in the event of fracture under high torque stresses.

While the reinforcement mechanism and the molding method herein disclosed have been described in the context of hand tools, it will be appreciated that they could be used in other high-stress applications and, while the body of the tools described herein are formed of glass-filled nylon material, it will be appreciated that other non-metallic materials could be used, including nylon, urethane, polypropylene, glass-filled polypropylene and others. Also the bands could be formed of materials other than SANTOPRENE.

From the forgoing it can be seen that there has been provided an improved composite tool and method of making same, which minimizes mold tooling costs while at the same time providing effective reinforcement against tool fragmentation during high-stress applications.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A structure comprising:
   a non-metallic body formed of a glass-filled nylon material and having a first exterior surface, and
   a continuous band of flexible and resilient non-metallic material encompassing the body and bonded to the exterior surface, wherein the continuous band has a second exterior surface which is flush with the first exterior surface.

2. The structure of claim 1, wherein the band is formed of a thermoplastic elastomer material.

3. The structure of claim 2, wherein the band is chemically bonded to the exterior surface of the body.

4. The structure of claim 1, wherein the structure is a socket, the body having receptacles respectively formed in opposite ends thereof.

5. The structure of claim 1, wherein the body forms a tool handle.

6. The structure of claim 1, wherein the body forms a screwdriver shank.

7. A structure comprising:
   a non-metallic body having a first exterior surface and an end,
   an insert disposed in the end of the body and fixed thereto, and
   a continuous band of flexible and resilient non-metallic material encompassing the body and bonded to the exterior surface around the insert, wherein the continuous band has a second exterior surface which is flush with the first exterior surface.

8. The structure of claim 7, wherein the structure is a socket, the body having receptacles respectively formed in opposite ends thereof.

9. The structure of claim 8, and further comprising an insert embedded in an end of the body and defining one of the receptacles.

10. The structure of claim 9, and further comprising a second continuous band of flexible and resilient non-metallic material encompassing the body and bonded to the exterior surface, the bands being respectively disposed around the inserts.

11. The structure of claim 8, and further comprising two inserts respectively embedded in opposite ends of the body and respectively defining the receptacles.

12. The structure of claim 8, wherein the insert is formed of metal.

13. The structure of claim 7, wherein the body forms a screwdriver shank, and further comprising a bit embedded in an end of the body and projecting therefrom.

14. The structure of claim 13, wherein the bit has a Phillips tip at one end thereof embedded in the body and a flat-bladed tip at the other end thereof projecting from the body.

15. A method of forming a structure comprising:
   providing a mold defining a mold cavity,
   disposing in the mold cavity a preformed continuous band of flexible and resilient non-metallic material, and
   then injecting into the cavity moldable thermoplastic material so that it flows inside the band and forces the band against the mold at the periphery of the cavity and bonds to the band, wherein the moldable material forms a socket tool and an insert defines a receptacle at an end of the socket tool.

16. The method of claim 15, wherein the moldable material forms a screwdriver shank, the insert being a screwdriver bit projecting from an end of the shank.

17. A structure comprising:
   a non-metallic body having a first exterior surface, and
   a continuous band formed of a flexible thermoplastic elastomer material encompassing the body and chemically-bonded to the exterior surface of the body, wherein the continuous band has a second exterior surface which is flush with the first exterior surface.

18. The structure of claim 17, wherein the body is formed of a thermoplastic material.

19. The structure of claim 18, wherein the body is formed of a glass-filled nylon material.

20. The structure of claim 17, wherein the structure is a socket, the body having receptacles respectively formed in opposite ends thereof.

21. The structure of claim 17, wherein the body forms a tool handle.

22. The structure of claim 17, wherein the body forms a screwdriver shank.

23. A socket comprising:
   a non-metallic body having a first exterior surface and receptacles respectively formed in apposite ends thereof, and
   a continuous band of flexible and resilient non-metallic material encompassing the body and bonded to the exterior surface, wherein the continuous band has a second exterior surface which is flush with the first exterior surface.

24. A structure comprising:
   a non-metallic body forming a screwdriver shank and having a first exterior surface, and
   a continuous band of flexible and resilient non-metallic material encompassing the body and bonded to the exterior surface, wherein the continuous band has a second exterior surface which is flush with the first exterior surface.

* * * * *